United States Patent
Lafond et al.

(10) Patent No.: US 6,446,807 B1
(45) Date of Patent: Sep. 10, 2002

(54) ASSEMBLY OF MODULAR CONTAINERS FOR HANDLING, TRANSPORTING AND STORING MICROSCOPE SPECIMEN SLIDES

(75) Inventors: André Lafond, St-Hilaire; Yanick Bertin, Verchéres, both of (CA)

(73) Assignee: 3088081 Canada, Inc. (CA)

( * ) Notice: Subject to any disclaimer, the term of this patent is extended or adjusted under 35 U.S.C. 154(b) by 0 days.

(21) Appl. No.: 09/766,556

(22) Filed: Jan. 19, 2001

(51) Int. Cl.⁷ .............................................. B65D 85/48
(52) U.S. Cl. ...................................... 206/456; 206/509
(58) Field of Search ................................ 206/456, 455, 206/509, 511, 512, 503, 449, 564; 220/315.2, 23.83

(56) References Cited

U.S. PATENT DOCUMENTS

| | | | |
|---|---|---|---|
| 2,456,481 A | * 12/1948 | Ballantyne et al. | 206/509 |
| 3,407,960 A | * 10/1968 | Rogus | 206/509 |
| 3,416,704 A | * 12/1968 | Frater | 206/509 |
| 3,638,827 A | * 2/1972 | Lau, Jr. et al. | 206/511 |
| 4,440,301 A | * 4/1984 | Intengan | 206/456 |
| 4,819,804 A | 4/1989 | Levy | |
| 5,044,500 A | 9/1991 | Webber | |
| 5,090,568 A | 2/1992 | Tse | |
| 5,186,345 A | * 2/1993 | Ching An | 220/23.4 |
| 5,287,966 A | * 2/1994 | Stahl | 206/509 |
| 5,318,182 A | * 6/1994 | Thorud et al. | 206/509 |

* cited by examiner

*Primary Examiner*—Shian Luong
(74) *Attorney, Agent, or Firm*—Akerman Senterfitt

(57) ABSTRACT

An assembly of stacked modular containers for handling, transporting and storing microscope specimen slides is described. The side walls of the rectangular-shaped containers have slide interconnections so that the containers may be longitudinally slid relative to one another. A releasable locking arrangement is provided on the extension of one of the other container walls to prevent unwarranted longitudinal sliding movement of the containers and to retain them in a secured stack formation. The extension of the container wall is made flexible to enable manual disengagement of locking members on the extension to thereby allow the sliding of containers for insertion or removal of slides into and from the containers.

11 Claims, 4 Drawing Sheets

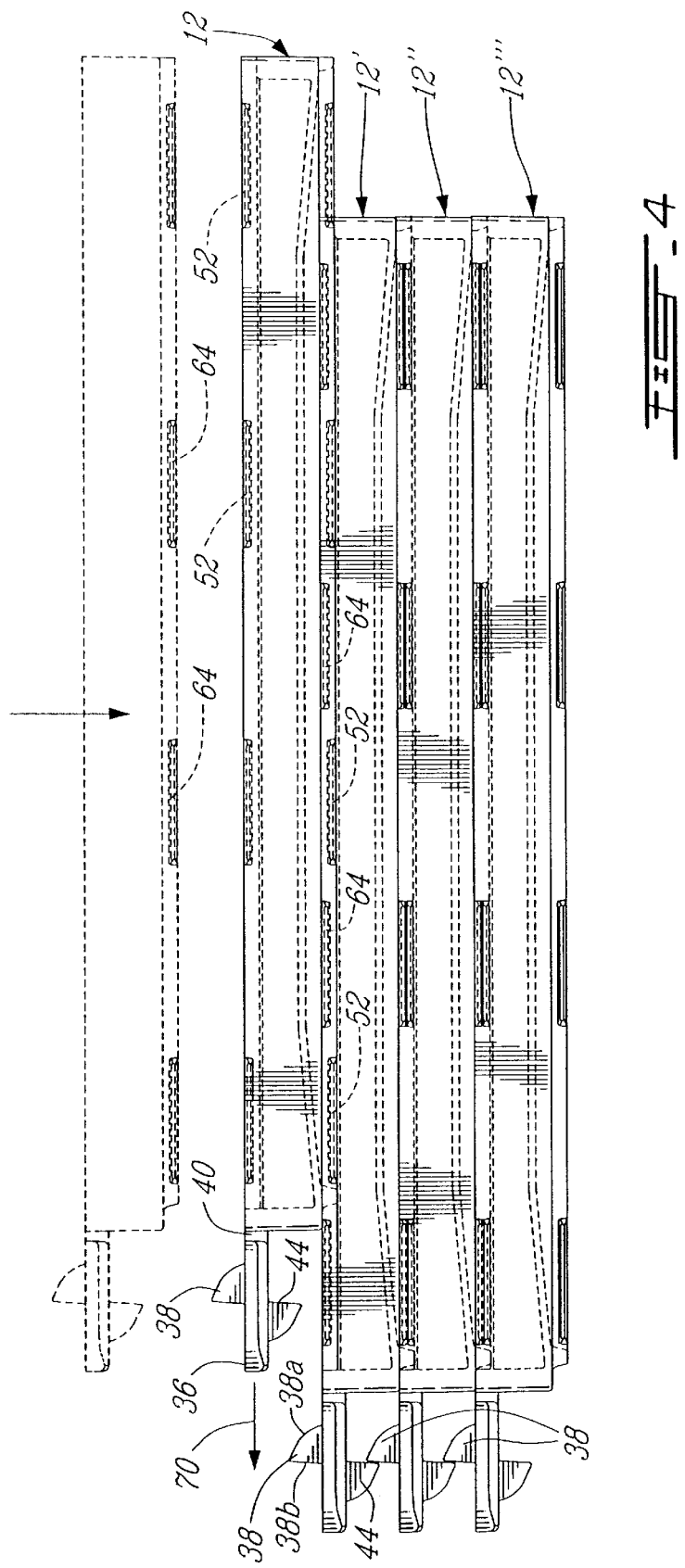

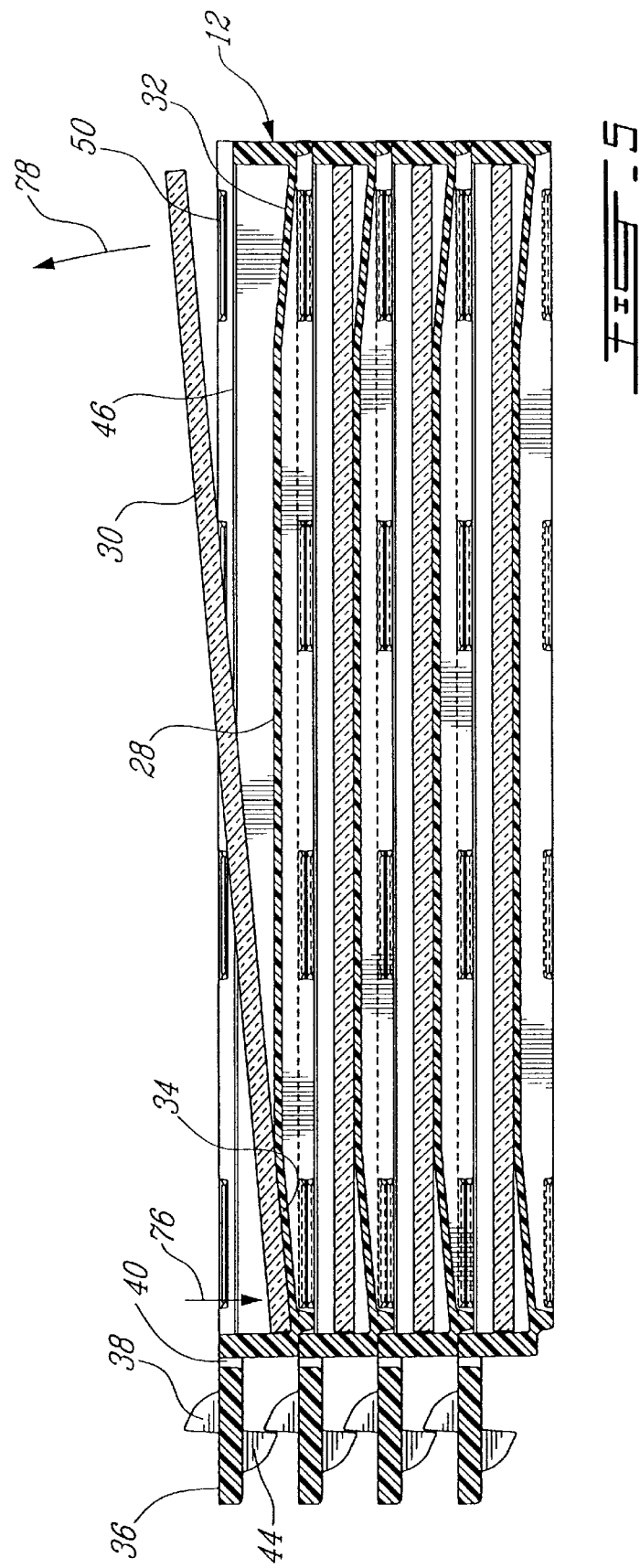

ASSEMBLY OF MODULAR CONTAINERS FOR HANDLING, TRANSPORTING AND STORING MICROSCOPE SPECIMEN SLIDES

FIELD OF THE INVENTION

The present invention pertains to an assembly of modular containers for the handling, transporting and storing of microscope specimen glass slides.

BACKGROUND OF THE INVENTION

In order to obtain an analysis of biological samples in medical fields such as microbiology, cytology, hematology, etc., various kits and containers have been devised for transporting specimen slides to laboratories.

Such containers may be found described, for example, in U.S. Pat. No.4,044,500 issued on Sep. 3, 1991 to Webber et al. which illustrates a package for handling and transporting glass slides. U.S. Pat. No. 5,090,568 issued on Feb. 25, 1992 to Tse, and U.S. Pat. No. 4,819,804 issued on Apr. 11, 1989 to Levy describe individual slide holders.

OBJECTS AND STATEMENT OF THE INVENTION

It is an object of the present invention to provide a new and improved assembly of specimen slide containers which preserve the slides in a secure manner during handling, storage and transportation.

Another object of the present invention is to provide a new and improved specimen slide container which is capable of being assembled with similarly constructed containers in a stacked arrangement.

Still, another object of the present invention is to provide such an assembly of specimen containers wherein the access to any one container of the stacked arrangement may be easily done selectively.

Further, an object of the invention is to facilitate manual retrieval of a glass slide from any one container.

The present invention therefore relates to an assembly of modular containers for handling, transporting and storing microscope specimen slides wherein the containers are stacked when assembled and wherein each container comprises:

- a rectangular shaped body having opposite front and rear end walls, opposite side walls and a bottom wall defining a receptacle area to receive a specimen slide therein;
- engaging means on the opposite side walls enabling inter-engagement of the body with superposed and underposed similarly constructed bodies; the engaging means allowing the bodies to be longitudinally slid relative to one another;
- locking means integral with one of the end walls of the body adapted to contact corresponding locking means on the upperposed and underposed bodies to prevent the bodies from unwarranted longitudinal sliding movement relative to one another; and
- means allowing release of the locking means to thereby allow the bodies to be manually slid relative to one another for insertion or removal of slides into and from the bodies.

In one form of the invention, the container body displays an integral extension on one of its end walls on which the locking means are provided in the form of a finger gripping means.

In a further form of the invention, this extension is made flexible whereby manual pressure thereon enables the release of the locking means.

Other objects and further scope of applicability of the present invention will become apparent from the detailed description given hereinafter. It should be understood, however, that this detailed description, while indicating preferred embodiments of this invention, is given by way of illustration only since various changes and modifications within the spirit and scope of the invention will become apparent to those skilled in the art.

BRIEF DESCRIPTION OF THE DRAWINGS

FIG. 4 is an elevational view showing a sliding engagement of one container to the other containers of the assembly; and FIG. 5 is a longitudinal cross-sectional view of the assembly illustrating the removal of a glass slide.

DESCRIPTION OF PREFERRED EMBODIMENTS

Figure 1:
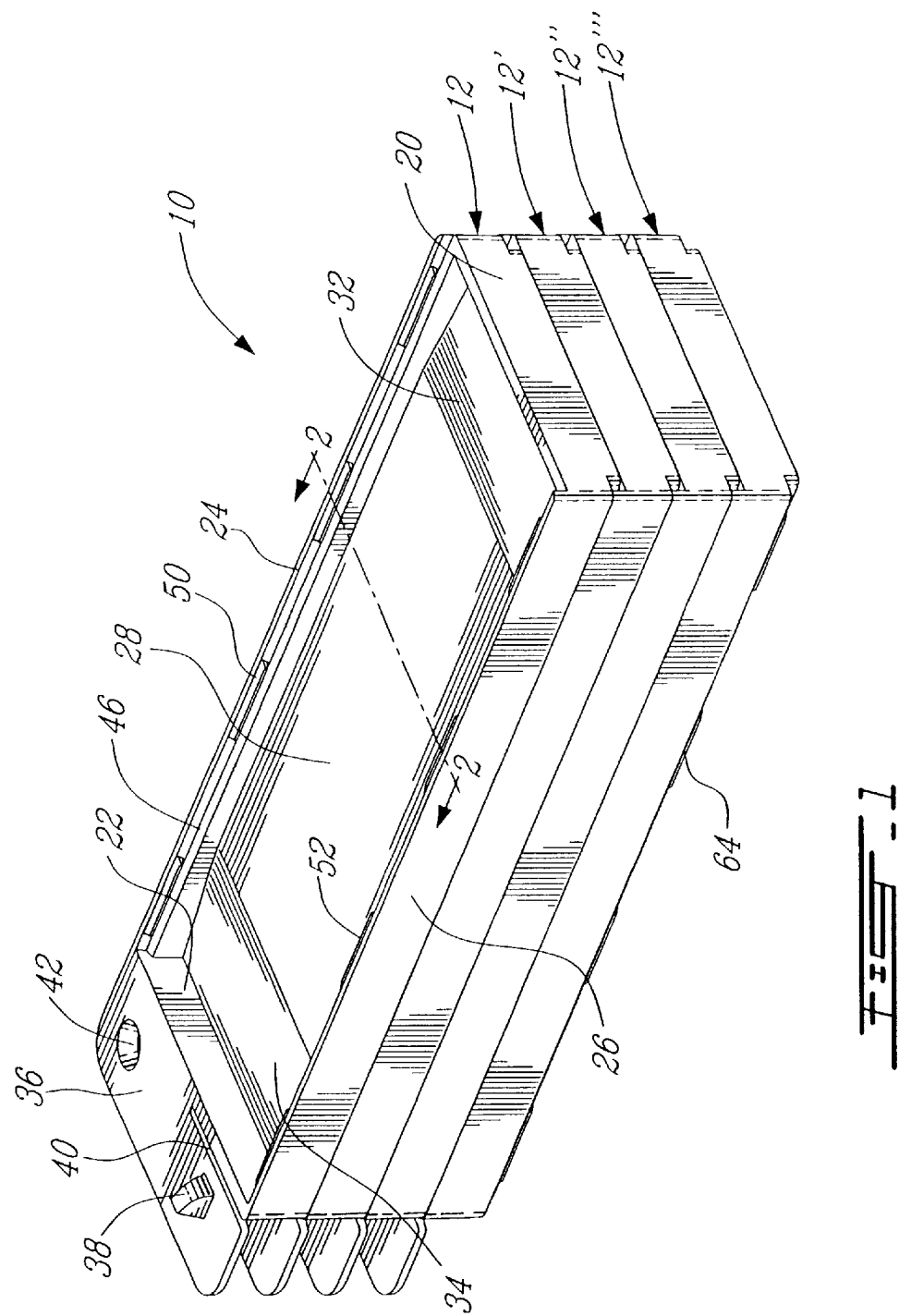
FIG. 1 is a perspective view of an assembly of modular containers made in accordance with the present invention.

Referring to FIG. 1, there is shown an assembly, generally denoted 10, of four identically constructed modular containers 12, 12', 12", 12''' for handling, transporting and storing microscope specimen slides. The containers are shown in stacked formation.

A detailed description of one container only will be given. Container 12 has a rectangular-shaped body with opposite rear and front end walls 20 and 22, opposite side walls 24 and 26, and a bottom wall 28 thereby defining a receptacle area to receive a specimen glass side 30 (see FIG. 2). The bottom wall has two inclined areas 32 and 34, the function of which will be described further below.

Figure 3:
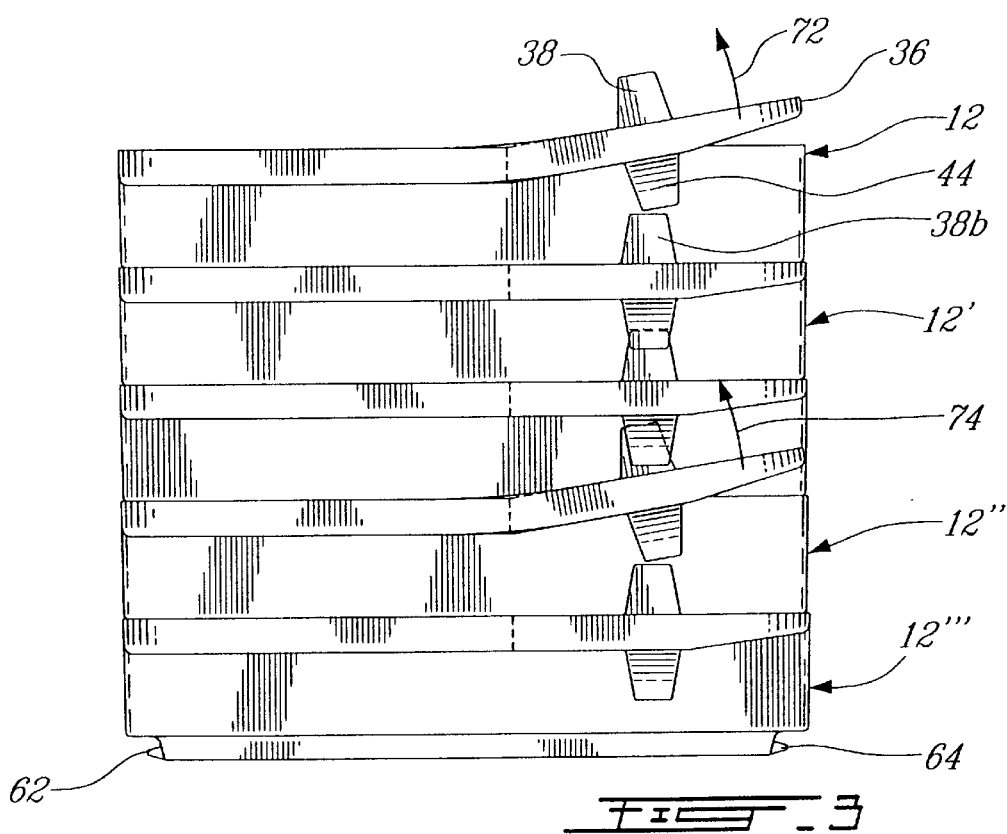
FIG. 3 is an enlarged end view showing disengagement of the locking means on the containers of the assembly.

From the front wall 20 is displayed an integral outward extension 36, the top face of which displays a projecting member 38, a slit 40 and a hole 42. As can be seen in FIG. 3, the under surface of the extension 36 also displays a projecting member 44 having a shape complementary to the shape of the projecting member 38.

Figure 2:
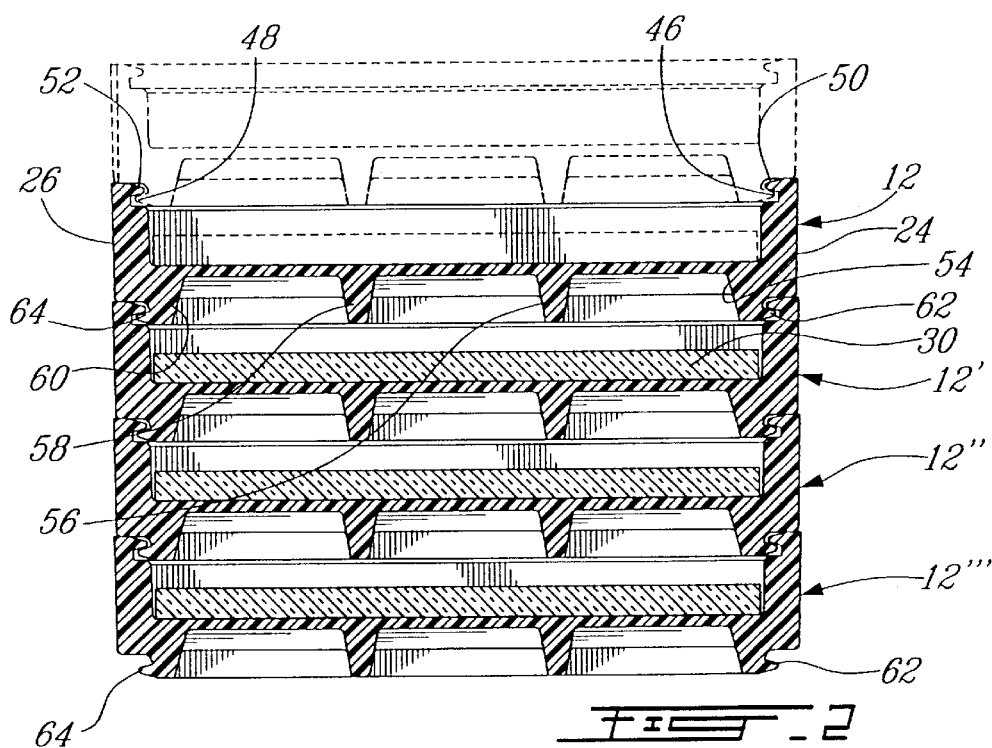
FIG. 2 is a vertical cross-sectional view taken along line 2—2 FIG. 1.

Referring also to FIG. 2, the upper edges of the side walls 24 and 26 respectively display a longitudinal shoulder 46, 48, while the inner face of the side wall adjacent the upper edges displays a series of longitudinal-spaced inwardly projecting ribs 50, 52 respectively. The under face of the container comprises a series horizontally spaced longitudinal ribs 54, 56, 58 and 60. The outer longitudinal ribs 54 and 60 respectively display a series of longitudinal-spaced fingers 62, 64, which are adapted to slide onto the shoulders 46 and 48 of the side walls of an underposed container and to rest under their associated fingers 50 and 52 at the upper edge of the side walls of the underposed container.

FIG. 4 shows the sliding engagement of a container 12 onto an underposed container 12'. It can be seen that, as the container 12 slides in the direction indicated by arrow 70, it will reach a locking arrangement with container 12' where the projecting member 44 of container 12 slides on the rounded back 38a of the projecting member 38 of container 12' to rest behind the vertical side 38b. As shown in FIG. 3, arrow 72 indicates the flexing motion to be applied manually to the extension 36 to disengage member 44 of container 12 from member 38 of the underposed container 12'. Arrow 74 indicates that any one of the containers may be selected to disengage, in which case a series of superposed containers may be slid together relative to the remaining stack of containers.

Referring to FIG. 5, arrow 76 indicates that a finger pressure can be applied on one end of the glass slide 30 whereby the latter may adopt the inclination of the depression 34 with the opposite end of the glass slide being raised thereby to facilitate its removal as indicated by arrow 78.

The provision of the hole 42 on each extension 36 of the containers allows a band or string to be passed through all the holes of the stacked assembly to further secure the modular containers in their locked and stacked condition during transport or handling.

A preferred material for the container is plastic so as to provide the flexibility required to effect the locking and unlocking of the containers to one another.

Although the invention as been described above with respect to one specific form, it will be admitted to the person skilled in the art that it may be refined and modified in various ways. It is therefore wished to have it understood that the present invention should not be limited in interpretation except by the terms of the following claims.

What is claimed is:

1. An assembly of modular containers for handling, transporting and storing microscope specimen slides, the containers being stacked when assembled, each said container comprising:

a rectangular shaped body having opposite front and rear end walls, opposite side walls and a bottom wall defining a receptacle area to receive a specimen slide therein;

engaging means on said opposite side walls enabling inter-engagement of said body with superposed and underposed similarly constructed bodies; said engaging means allowing said bodies to be longitudinally slid relative to one another;

locking means integral with one of said end walls of said body adapted to contact corresponding locking means on said upperposed and underposed bodies to prevent said bodies from unwarranted longitudinal sliding movement relative to one another; and means allowing release of said locking means to thereby allow said bodies to be manually slid relative to one another for insertion or removal of slides into and from said bodies.

2. An assembly as defined in claim 1, wherein said engaging means comprise ribs at upper and lower edges of said opposite side walls of said body so that ribs at the lower edges of the opposite walls of an upper container may slidably and interlockinly engage ribs at the upper edges of the opposite walls of an underposed container.

3. An assembly as defined in claim 1, wherein said one end wall of said body displays an integral extension and wherein said locking means comprise projecting members disposed on upper and lower faces of said extension.

4. An assembly as defined in claim 3, wherein said means allowing release of said locking means consist of a flexible portion on said extension whereby manual pressure applied on said flexible portion enables release of said locking means from on another.

5. An assembly as defined in claim 4, wherein said extension displays a slit to form said flexible portion.

6. An assembly as defined in claim 3, wherein said extension displays an opening allowing insertion of a securing means for retaining said bodies in stacked condition.

7. An assembly as defined in of claim 1, wherein said bottom wall has an under face provided with longitudinally extending ribs to assist in securing a specimen slide in said receptacle area of an underposed body.

8. An assembly according to claim 1, wherein said bottom wall has an upper face with depression means to assist in manual removal of a specimen slide from said receptacle area.

9. An assembly as defined in claim 8, wherein said depression means on said bottom wall are provided adjacent said front wall and said rear end walls.

10. An assembly according to claim 1, wherein said body is made of plastic material.

11. A modular slide container for handling, transporting and storing specimen slides, the container being adapted for stacking with similarly constructed containers to form a stack assembly, said container comprising: a rectangular shaped body having front, rear, bottom and opposite side walls defining an opened area to receive a specimen slide therein;

engaging means on said side walls enabling said body to be slidably connected to similarly constructed superposed and underposed bodies; said front wall displaying an integral extension; locking means on upper and lower faces of said extension; said extension including a flexible portion enabling manual flexing thereof to disengage said locking means whenever engaged with locking means of similarly constructed stacked bodies.

\* \* \* \* \*